United States Patent [19]

Iwanami et al.

[11] 4,214,898

[45] Jul. 29, 1980

[54] PROCESS FOR PREVENTING THE REPHOSPHORIZATION OF ELECTRIC STEEL

[75] Inventors: Yoshiyuki Iwanami; Masaru Fukumoto; Mitsunori Funazaki, all of Muroran, Japan

[73] Assignee: The Japan Steel Works, Ltd., Tokyo, Japan

[21] Appl. No.: 17,231

[22] Filed: Mar. 5, 1979

[30] Foreign Application Priority Data

Mar. 24, 1978 [JP] Japan ................................ 53-32999

[51] Int. Cl.² ........................... C21C 5/52; C21C 7/00
[52] U.S. Cl. ............................................. 75/12; 75/60
[58] Field of Search ...................................... 75/10-13, 75/60

[56] References Cited

U.S. PATENT DOCUMENTS 2,704,247  3/1955  Connor .................................. 75/12

Primary Examiner—P. D. Rosenberg

[57] ABSTRACT

This invention relates to a process for preventing the rephosphorization phenomenon in which, during the production of killed steel in a basic electric furnace, a part of the phosphorus oxide formed and removed in the oxidizing period is reduced in the subsequent deoxidizing period to increase the phosphorus content of the melt again. This process comprises subjecting the melt to oxidizing refinement in the electric furnace, pouring the resulting undeoxidized melt and slag into a ladle, removing the slag of the oxidizing period completely from the melt either by skimming it off or by pouring only the melt into another ladle, and then deoxidizing the melt in the ladle. According to this process, the rephosphorization phenomenon attributable to the residual slag of the oxidizing period adhering to the wall surfaces of the furnace and/or the phosphorus pentoxide ($P_2O_5$) absorbed in the lining during the oxidizing period can be prevented to a substantially complete degree, as contrasted with the conventional process in which both oxidizing and deoxidizing steps are carried out in an electric furnace.

3 Claims, 3 Drawing Figures

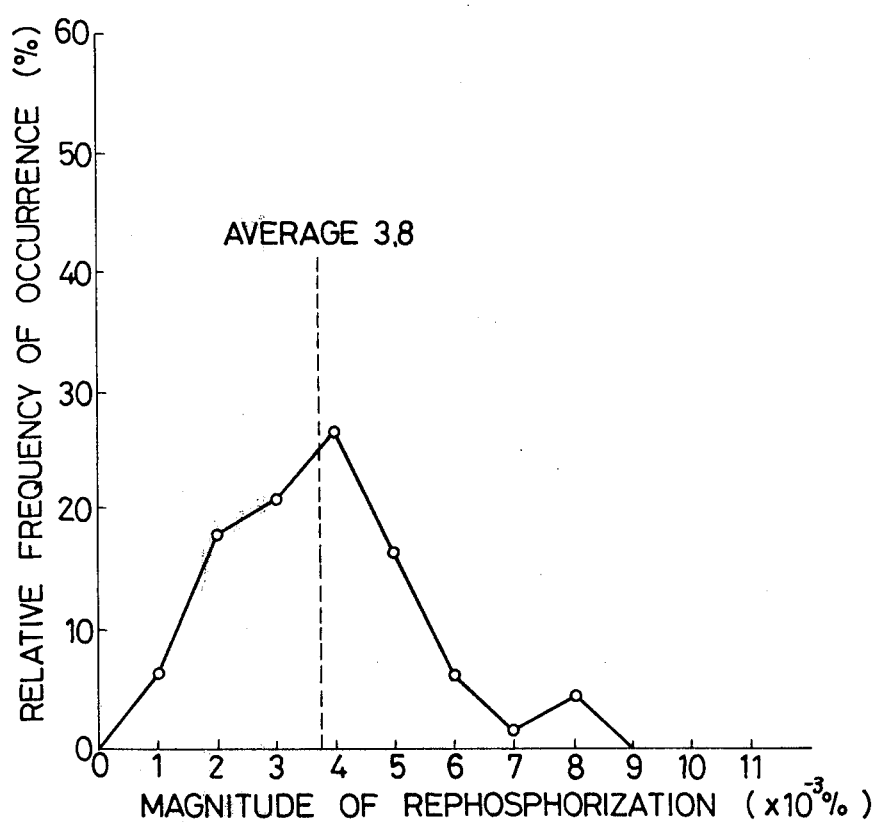
F I G. 2

PROCESS FOR PREVENTING THE REPHOSPHORIZATION OF ELECTRIC STEEL

BACKGROUND OF THE INVENTION

This invention relates to a process for preventing the rephosphorization of killed steel being produced in a basic electric furnace. More particularly, it relates to a process for preventing the so-called rephosphorization phenomenon in which, during the production of killed steel in a basic electric furnace, a part of the phosphorus oxide formed and removed in the oxidizing period is reduced in the subsequent deoxidizing period to increase the phosphorus content of the melt agian.

The conventional process for producing killed steel in an electric furnace generally comprises the oxidizing refining step in which the molten iron or melt placed in the furnace is decarburized and heated by blowing oxygen therethrough, the skimming step in which the slag is removed from the melt, and the deoxidizing and desulfurizing step in which such materials as slag formers, deoxidizing agents, and ferroalloys for controlling the composition are added to the melt.

In the above-described oxidizing refining step, dephosphorization takes place along with decarburization, as represented by the following equation:

$$2P + 5O + nCaO \rightarrow P_2O_5 \cdot nCaO$$

It is generally believed that this reaction proceeds favorably when the following conditions are satisfied.
(1) The oxygen content of the melt is high.
(2) The reaction temperature is low.
(3) The CaO content of the slag is high.
(4) The $P_2O_5$ content of the slag is low.

It is necessary for the removal of phosphorus, therefore, to supply oxygen to the melt at a relatively low-temperature stage of the oxidizing refining step, while adding thereto lime (quick lime or limestone) and fluorite for promoting the slagging of the lime.

Especially in cases where an electric furnace is used to produce high-grade steels requiring the removal of such impurities as sulfur and oxygen, the oxidizing refining step is generally followed by a step serving for deoxidization and desulfurization, which is often referred to as the reducing period. In this period, the slag of the oxidizing period is skimmed off, and such materials as deoxidizing agents and slag formers are added to effect the reducing reactions for the removal of oxygen and sulfur. Accordingly, if a part of the slag of the oxidizing period ramins in the reducing period, the phosphorus pentoxide ($P_2O_5$) contained therein is reduced to cause the rephosphorization phenomenon in which the phosphorus content of the melt is increased again.

On the other hand, in an electric furnace using dolomite brick for the lining, the phosphorus pentoxide ($P_2O_5$) absorbed in the lining during the oxidizing period is reduced by reaction with the deoxidizing agents used during the reducing period, so that the phosphorus content of the melt is increased again. This also accounts for at least a part of the rephosphorization phenomenon.

The countermeasures which are currently taken for the purpose of preventing the above-described rephosphorization phenomenon are to use large amounts of lime and fluorite in the oxidizing period to minimize the phosphorus pentoxide ($P_2O_5$) contained in the slag of the oxidizing period, and to remove the slag of the oxidizing period as completely as possible before the reducing period is initiated. However, it is very difficult to remove more than 90% of the slag present in the electric furnace, and it is impossible to remove completely the residual slag of the oxidizing period adhering to the wall surfaces of the furnace. It is inevitable, therefore, that a certain degree of rephosphorization occurs in the conventional process.

Even if the above-described preventive measures are taken, low-alloyed steels undergo such a magnitude of rephosphorization as it is illustrated in FIG. 2. Specifically, the magnitude of rephosphorization is approximately 0.004% on the average. This phenomenon constitutes the greatest difficulty encountered in the production of low-phosphorus steels.

SUMMARY OF THE INVENTION

It is the primary object of this invention to provide a process for preventing, to a substantially complete degree, the rephosphorization phenomenon which has heretofore been considered to occur inevitably in the production of killed steel in a basic electric furnace.

In accordance with this invention, the foregoing object is accomplished by providing a process for preventing the rephosphorization of killed steel being produced in a basic electric furnace which comprises subjecting the melt to oxidizing refinement (decarburization) in the electric furnace, pouring the resulting decarburized melt and slag into a ladle, removing the slag of the oxidizing period completely from the melt, and then deoxidizing reducing the melt in the ladle.

BRIEF DESCRIPTION OF THE DRAWINGS

FIG. 2 is a graphical representation of the relationship between the magnitude of rephosphorization (%) and the relative frequency of occurrence (%) in the conventional process for producing steel in an electric furnace.

DETAILED DESCRIPTION OF THE PREFERRED EMBODIMENTS

The conventional process for producing low-phosphorus killed steel in a basic electric furnace comprises four steps: the meltdown, oxidizing, slag removal, and reducing steps. As was mentioned previously, a certain degree of rephosphorization is involved in this process. In order to prevent this rephosphorization phenomenon, the present inventor has made intensive and extensive studies and found that this problem can be substantially solved by adding to the conventional process another step of pouring the melt into a ladle.

That is, after the oxidizing step of the conventional process, the melt and slag which have been subjected to oxidizing refining are poured into a ladle, which is followed by the slag removal step. For this purpose, there are two methods that can be used in the practice of this invention. One of them is the reladling method by which only the melt is poured into another ladle through a tap hole provided at the bottom of the ladle, and the other is the skimming method by which the ladle is tilted and the slag is skimmed off with a wooden or steel rabble. This process makes it possible to perfectly separate the slag of the oxidizing period from the melt and thereby prevent, to a substantially complete degree, the rephosphorization phenomenon which is inevitable in the conventional process and attributable to the phosphorus present in the residual slag adhering to the wall surfaces of the furnace and/or the phosphorus absorbed in the lining of the furnace.

On the other hand, the present process involves an additional step, which seems to pose the problems of a rise in cost due to an increase of necessary equipment and labor, a thermal loss caused by pouring the melt into a ladle, and the like. However, such a rise in cost is insignificant as compared with the overall cost, and any other problem does not matter in consideration of the remarkable preventive effect on the rephosphorization phenomenon.

Figure 1:
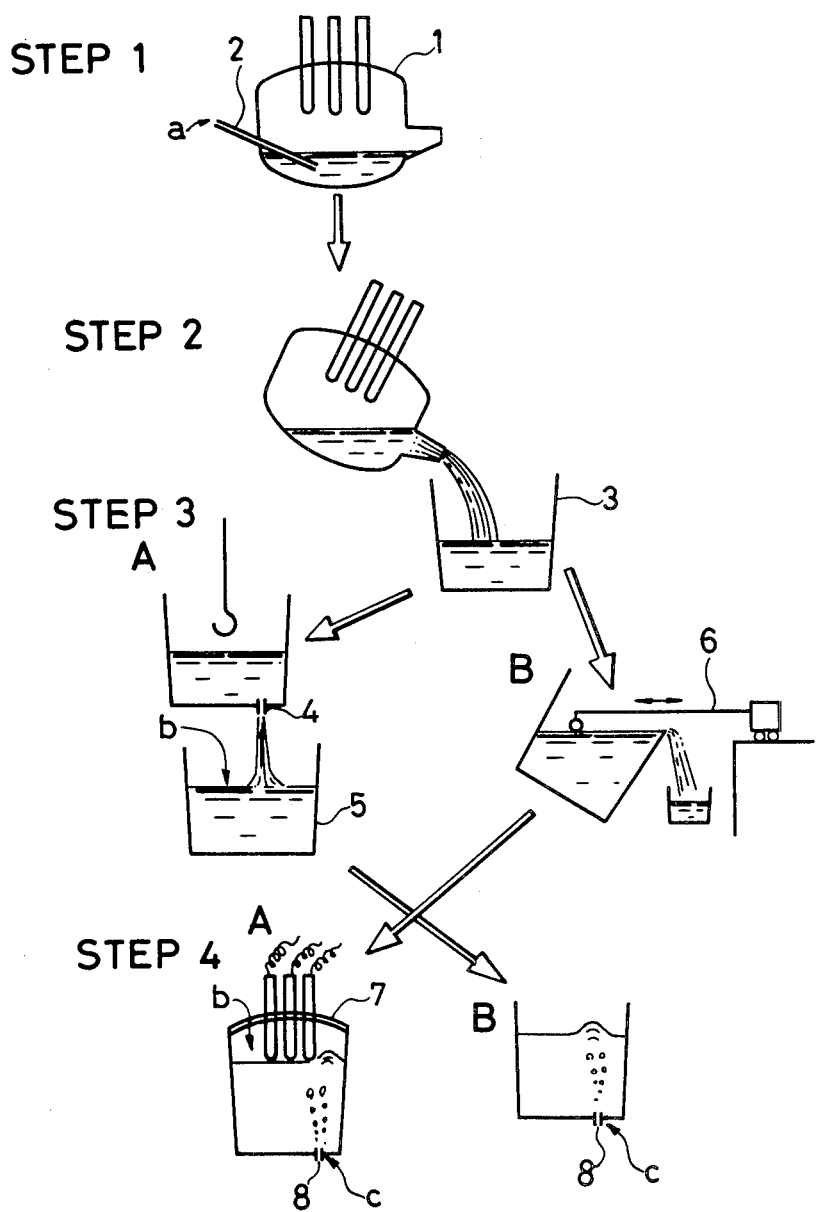
FIG. 1 is a flow diagram illustrating the present process for preventing rephosphorization.

The present process is more fully described with reference to the flow diagram of FIG. 1.

In step 1 (refining step), the charge is melted down and subjected to oxidizing refinement in a basic electric furnace 1. This step is the same as a conventional refining operation in which the charge is melted down and the resulting melt is decarburized and heated by blowing oxygen a therethrough. In step 2 (pouring step), the melt which now has a predetermined temperature and a desired carbon content is poured into a ladle 3. This step can be carried out in two different ways. One of them is to pour all of the slag of the oxidizing period, together with the melt, into a ladle. The other is to skim a part of the slag of the oxidizing period from the melt placed in the electric furnace and then pour the remaining slag of the oxidizing period, together with the melt, into a ladle. However, the former is more favorable in consideration of the smaller loss of heat from the melt. In step 3 (slag removal step), the slag of the oxidizing period containing phosphorus pentoxide ($P_2O_5$) is removed from the melt placed in the ladle. Two methods are available for this purpose. One of them is the reladling method (step 3-A) by which only the melt is poured into another ladle 5 through a tap hole 4 provided at the bottom of ladle 3, and the other is the skimming method (step 3-B) by which ladle 3 is tilted and the slag is skimmed off with a wooden or steel rabble 6. The former method which requires an additional ladle is disadvantageous from the viewpoint of cost, but has the advantages that the melt can be easily and completely prevented from being contaminated with the slag of the oxidizing period and that such materials as slag formers, deoxidizing agents, and ferroalloys for controlling the composition can be added during the reladling operation, as represented by an arrow b. The latter method which requires no additional ladle is advantageous from the viewpoint of cost and causes no significant thermal loss, but tends to present some difficulty in the complete removal of the slag.

In step 4-A, such materials as slag formers, deoxidizing agents, and ferroalloys for controlling the composition are added, as represented by an allow b, to the melt resulting from step 3-B, and an inert gas c is blown into the melt through an inlet 8 provided at the bottom of the ladle to stir the melt and thereby make its composition and temperature uniform. If the temperature of the melt is lower than a predetermined value, a ladle-type refining furnace 7 provided with a heating device should be used to heat the melt. In step 4-B, the melt resulting from step 3-A is subjected to the same treatment as described above.

The present process, which comprises the steps described above in connection with FIG. 1, makes it possible to remove almost all of the slag of the oxidizing period, thereby preventing the rephosphorization phenomenon to a substantially complete degree.

FIG. 2 represents the magnitude of rephosphorization (defined as the difference between the phosphorus content, in percent, at the end of the oxidizing refinement and the phosphorus content, in percent, at the end of the reducing refinement) observed in the conventional refining process using an electric furnace. In collecting these data, a type of steel requiring particularly low phosphorus contents was chosen as the subject and due consideration was given to prevent rephosphorization. That is, at the oxidizing period, large amounts of lime and fluorite were used to minimize the phosphorus pentoxide ($P_2O_5$) contained in the slag of the oxidizing period. Moreover, the slag of the oxidizing period was removed as completely as possible before the reducing period was initiated. Nevertheless, 67 measured values were scattered over a range of from 0.001 to 0.008%, the average thereof being 0.0038%.

Figure 3:
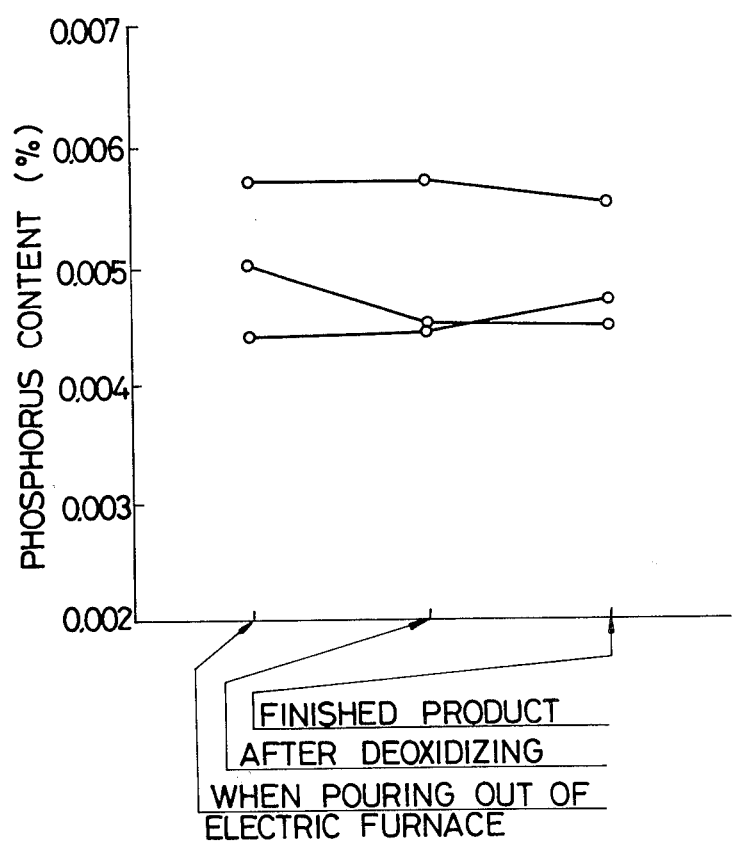
FIG. 3 is a graphical representation of the changes in phosphorus content at several stages of the present process.

FIG. 3 represents the changes in phosphorus content of the melt being treated according to the present process. It is evident from these data that the present process can prevent rephosphorization to a substantially complete degree. Specifically, the phosphorus content of the melt at the time of pouring out of the electric furnace (which corresponds to the end of the oxidizing period in the conventional refining process) ranged from 0.004 to 0.006%, which values were on a relatively high level for this stage. However, the phosphorus content of the finished product remained within the same range of from 0.004 to 0.006% because rephosphorization was prevented to a substantially complete degree.

What is claimed is:

1. A process for preventing the rephosphorization of killed steel being produced in a basic electric furnace, which process comprises subjecting the melt to a refinement treatment in the electric furnace by means of oxygen decarburization, pouring the resulting decarburized melt and slag into a ladle, separating said slag substantially completely from said decarburized melt, and then deoxidizing the melt in the said ladle.

2. The process as claimed in claim 1, wherein said slag is separated from said decarburized melt in said ladle by pouring said decarburized melt into another ladle through a tap hole provided at the bottom of the said ladle, and then deoxidizing the thus poured melt therein.

3. The process as claimed in claim 1, wherein the said slag is separated from said decarburized melt by skimming said slag from the decarburized melt in the ladle, which melt is then deoxidized therein.

* * * * *